Nov. 9, 1954   K. FEDERN   2,693,699
MACHINE FOR THE DYNAMIC TESTING OF MATERIALS
Filed Aug. 23, 1952   2 Sheets-Sheet 1

Inventor:
Klaus Federn

Nov. 9, 1954 — K. FEDERN — 2,693,699
MACHINE FOR THE DYNAMIC TESTING OF MATERIALS
Filed Aug. 23, 1952 — 2 Sheets-Sheet 2

Inventor: Klaus Federn

United States Patent Office 2,693,699
Patented Nov. 9, 1954

2,693,699

MACHINE FOR THE DYNAMIC TESTING OF MATERIALS

Klaus Federn, Darmstadt, Germany, assignor to Carl Schenck Maschinenfabrik Darmstadt G. m. b. H., Darmstadt, Germany, a German corporation Application August 23, 1952, Serial No. 306,040

Claims priority, application Germany September 1, 1951

5 Claims. (Cl. 73—92)

My invention relates to machines for the dynamic testing of materials and structural parts and is hereinafter described with reference to the drawings in which.

Dynamic testing machines, also called "pulsers" serve to test materials or structural parts under continuously applied pulsating or alternating tension-compression forces. In such machines, the specimen to be tested is made part of an oscillatory system and is subjected to oscillatory stresses by exciting the system, usually at or near resonance.

Figure 1:
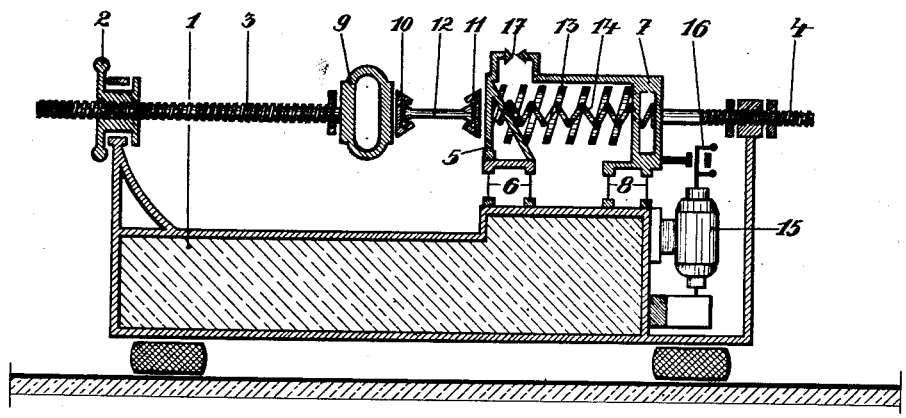
Fig. 1 is explanatory and shows a schematic sectional illustration of a known oscillatory testing machine of the general type here involved.

In the conventional machine, as shown in Fig. 1, a rigid base structure 1 carries at one end an interiorly threaded hand wheel 2 within which a rigid screw spindle 3 is axially displaceable for adjustment to the length of the specimen to be tested. Mounted at the other end of the machine base is a rigid screw spindle or loading spindle 4 which is coaxial with spindle 3 and also adjustable in the axial direction. Mounted on the machine frame 1 is further a head structure 5 which is supported by linking struts 6. The struts 6 permit head 5 to oscillate in the axial direction of the spindles and operate essentially as a parallel-motion guide for head 5. A spring abutment 7 is supported on base 1 by linking struts 8 so as to be capable of oscillatory motion in the axial direction of the spindles independently of the oscillatory movements of head 5. Mounted on spindle 3 is a force gage 9 which carries a chuck or clamping grip 10 axially opposite a similar grip 11 mounted on head 5. The specimen 12 is shown to be clamped by the two grips 10 and 11.

A helical spring 13 joins the head 5 with the abutment 7 and serves to impose a pulsating testing load upon the specimen. Another helical spring 14 joins head 5 with the loading spindle 4 to impose an adjusted static load upon the specimen. During the testing period, the abutment 7 is subjected to oscillatory forces. To this end, a motor 15 mounted on frame 1 is connected by a flexible shaft with an unbalance weight 16 revolvably mounted on the abutment structure 7. The motor speed may be regulated to oscillate the structure 7 in synchronism with the resonance frequency of the oscillatory system; and the machine is shown equipped with a periodically closing electric contact 17 for thus controlling the regulation of the motor, the electric regulator proper (not shown) being neither essential to an understanding of the mechanical machine operation nor relevant to the invention described in the following.

Dynamic testing machines of the kind shown in Fig. 1 operate satisfactorily as long as the frequency and the amplitude of the oscillatory deformations are kept below moderate limits, but have so far been unsuitable for testing at frequencies above about 1000 pulse cycles per minute with stress amplitudes above about 10 mm. This limitation is due to requirements concerning the loading spring. As soon as the specimen yields under the pulsing load and commences to perform deformative movements, an additional dynamic stress is superimposed upon the static stress of the loading spring 14. To minimize this additional stress, the loading spring must be given a small spring constant. This results in very large spring dimensions, as the volume of the spring increases in proportion to the ratio $P^2/c$, wherein $P$ is the highest stress applied to the spring, and $c$ is the spring constant. Almost one half of the mass of the loading spring 13 is to be taken as part of the movable mass of the oscillating clamping head. Hence, the operating frequency of the machine drops considerably with an increase in the size of the loading spring. Giving the loading spring a large mass also involves the danger that disturbing transversal or longitudinal oscillations may occur within the loading spring itself. It has been found that, for these reasons, a tension-compression pulser for amplitudes of more than 10 mm. deformation at frequencies of about 1000 cycles per minute are not feasible with the known machines.

It is an object of my invention to eliminate the above-explained shortcoming of the dynamic pulser-type testing machines and to permit increasing the testing frequency as well as the amplitude of oscillatory deformation far beyond the conventional limits.

To this end, and in accordance with a feature of my invention, I interpose between the static pre-loading spring and the oscillatory clamping head of the dynamic testing machine a force-transmitting lever mechanism which is pivoted to the base or frame structure of the machine and has relative to the oscillatory clamping head a point of connection located on the specimen axis. According to another feature of the invention, the axis of the pre-loading spring, as well as the axis of any pertaining loading spindle, are disposed in spaced relation to the specimen axis and the pre-loading spring is joined with the lever mechanism at a point between the above-mentioned point of connection and the fixed pivot or fulcrum of the lever mechanism.

It is not necessary that the preloading spring is of the helical tension-compression type. The lever mechanism, consisting of a rigid lever whose one end is fulcrumed to the machine base and whose other end is linked to the oscillatory clamping head, allows for fixing of other types of springs. According to still another feature of the invention, the pertaining pre-loading spring may therefore be of the torsional type and have its axis of torsional or bending deformation coincident with the fulcrum axis of the lever.

These and other objects and features of my invention will be apparent from the embodiments described in the following with reference to Figs. 2 to 4 of the drawing.

Figure 2:
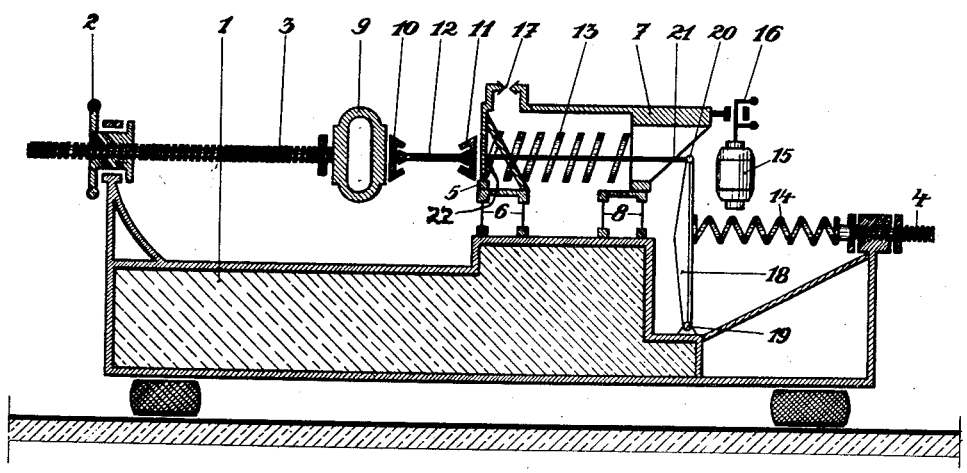
Fig. 2 is a schematic sectional view of a testing machine according to the invention.

In the machine illustrated in Fig. 2, the parts 1 to 17 are similar to the correspondingly denoted respective parts of the above-described machine of Fig. 1. According to Fig. 2, however, the axis of the helical pre-loading spring 14 and of the pertaining loading spindle 4 are downwardly displaced from the specimen axis of the machine, and the force of spring 14 is transmitted to the oscillating clamping head 5 through a lever mechanism. The mechanism comprises a rigid lever 18 which has one end fulcrumed at 19 to the machine base 1. The other end 20 of lever 18 is mechanically connected with the clamping head through a link 21 which, in the illustrated example, is pivoted at 22 to the clamping head 5. The spring 14 is joined with the lever 18 at a point between the fulcrum 19 and the specimen axis, the point of connection of the lever mechanism being located on the specimen axis. The pre-loading spring 14 may be joined with lever 18 by a link. My invention applies not only to the shown design in which the pre-load spring acts directly upon the head 5, but also to designs in which the preload spring acts on the abutment structure 7.

With a transmission ratio of only 1:2 of lever 18 the pre-loading spring 14 can be given a spring constant four times that of the corresponding loading spring in a machine of the kind shown in Fig. 1 for imposing the same static loading upon the specimen. Due to this transmission ratio, the effect of the inherent mass of the pre-loading spring is reduced to about one-quarter, and the natural frequency of the spring increases to about the double value. Nevertheless, the volume occupied by the pre-loading spring is not affected by the interposed lever because the value of the ratio $P^2/c$, corresponding to the energy stored in the spring, remains unchanged. Consequently, a machine according to the invention can be operated at a much higher frequency and also with a higher amplitude of specimen deformation than the known machines.

For simplifying the machine design and also for reducing the space requirements, it is often advantageous to provide torsional-type springs instead of the tension-compression spring shown in Fig. 2. A lever mechanism equipped with such springs is shown, for instance, in Figs. 3 and 4. In these figures the transmission lever, to be linked to the oscillating clamping head of a machine otherwise as shown in Fig. 2, is denoted by 23. This lever is joined with two helical springs 24 and 25 which have one of their respective ends joined with the lever 23 while the other end of each spring is connected to a lever 26 and a lever 27 resp. The fulcrum axis 28 of the lever 23 is preferably so located that it coincides with the common axis of torsional or bending movement of the springs 24, 25. If the torsional springs are given sufficient stiffness, the lever may be directly mounted upon the spring ends so that the lever is pivotally supported by the springs and does not require the provision of a fulcrum or pivot shaft.

The ends of levers 26 and 27 are connected to the spindle 4 which is shown in Figs. 1 and 2, by means of fulcrums 29, 30, and a stirrup 31.

Figure 3:
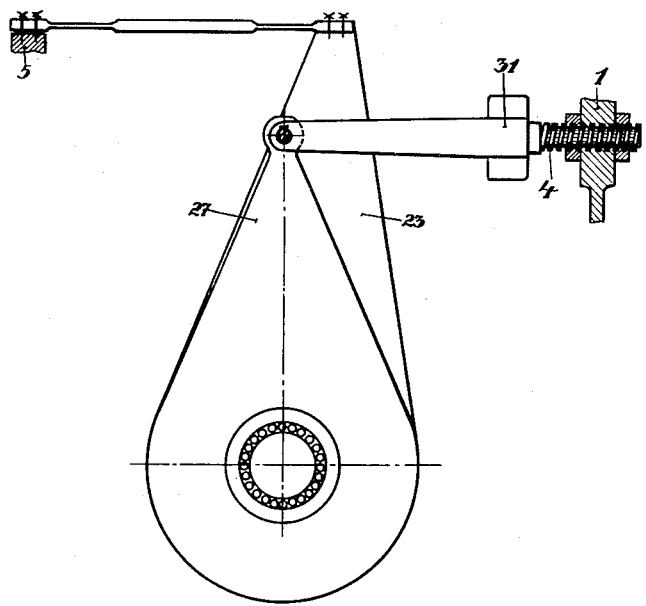
Figs. 3 and 4 are respectively a side view and a front view of a pre-loading spring assembly applicable in a machine otherwise similar to that of Fig. 2.
Figure 4:
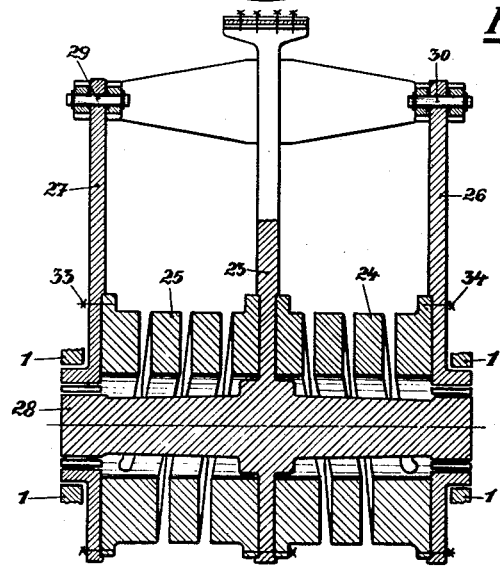

Each of the springs 24 and 25 according to Figs. 3 and 4 can be produced by cutting it out of a hollow cylindrical body, for instance of steel, so that each spring forms an integral piece with the pertaining tensioning flange 33 or 34. The helical strip portion of each spring structure has a rectangular cross section. The entire spring structure is so stiff that the lever 23 can be firmly and rigidly joined with the adjacent spring ends without requiring a pivot pin. The torsional spring may also be of a torsion bar type with round section or multiple plate-rectangular section (a well-known design in automotive vehicles).

In a machine according to Fig. 2 the desired amount of static pre-loading can be adjusted by correspondingly displacing the loading spindle 4 in the same manner as in the known machine according to Fig. 1. A corresponding adjustment of the pre-loading force is effected in the embodiments of Figs. 3 and 4 by imparting a force or torque to the torsional springs. This can be done, for instance, either by displacing the firmly mounted spring end and the fulcrum of lever 23 relative to the machine base, or by changing the angular position of the tensioning flanges 33 and 34 relative to the machine base, as it is shown in Fig. 4.

It will be obvious to those skilled in the art upon a study of this disclosure that machines according to my invention may be modified in various respects and may be embodied in designs other than those specifically described in this specification, without departing from the essence of my invention and within the scope of the claims annexed hereto.

I claim:

1. A dynamic testing machine for subjecting a specimen to simultaneous pulsating and static loads, comprising a machine base, a head structure oscillatorily mounted on said base, two coaxial holders mounted on said base and on said head structure respectively for securing between them a specimen to be tested, an oscillatory exciter having a coupling spring connected to said head structure for applying dynamic load to the specimen, a static loading spring having one end joined with said base and having the other end joined with said head structure, and a transmission linkage interposed between said loading spring and said head structure, said linkage being pivoted on said base and having relative to said head structure a point of connection on the specimen axis of said holders.

2. A dynamic testing machine for subjecting a specimen to simultaneous pulsating and static loads, comprising a machine base, a head structure oscillatorily mounted on said base, two coaxial holders mounted on said base and on said head structure respectively for securing between them a specimen to be tested, an oscillatory exciter having a coupling spring connected to said head structure for applying dynamic load to the specimen, a static loading spring having one end joined with said base and having the other end joined with said head structure, and a lever mechanism interposed between said loading spring and said head structure, said mechanism being pivotally linked to said base and having relative to said head structure a larger leverage than relative to said loading spring.

3. A dynamic testing machine for subjecting a specimen to simultaneous pulsating and static loads, comprising a machine base, a head structure oscillatorily mounted on said base, two coaxial holders mounted on said base and on said head structure respectively for securing between them a specimen to be tested, an oscillatory exciter having a coupling spring connected to said head structure for applying dynamic load to the specimen, an axially adjustable member mounted on said base, a helical tension-compression spring for statically loading the specimen, said loading spring having one end joined with said adjustable member, a transmission lever interposed between said loading spring and said head structure, said lever being fulcrumed on said base and having relative to said head structure a point of connection on the specimen axis of said holders, said loading spring and said adjustable member having a common axis spaced from and parallel to said specimen axis, and said loading spring being connected with said lever at a point intermediate the fulcrum point and said point of connection.

4. A dynamic testing machine for subjecting a specimen to simultaneous pulsating and static loads, comprising a machine base, a head structure oscillatorily mounted on said base, two coaxial holders mounted on said base and on said head structure respectively for securing between them a specimen to be tested, an oscillatory exciter having a coupling spring connected to said head structure for applying dynamic load to the specimen, a transmission lever having a fulcrum on said base and being linked with said head structure, and a torsional loading spring having one end connected with said base and having the other end connected with said lever to apply a static load to the specimen, said loading spring having a torsion axis coincident with the fulcrum axis of said lever.

5. A dynamic testing machine for subjecting a specimen to simultaneous pulsating and static loads, comprising a machine base, a head structure oscillatorily mounted on said base, two coaxial holders mounted on said base and on said head structure respectively for securing between them a specimen to be tested, an oscillatory exciter having a coupling spring connected to said head structure for applying dynamic load to the specimen, two torsional loading springs having a common torsion axis, a load-transmission lever disposed between said two loading springs and firmly connected with both so as to be capable of pivotal motion about said torsion axis, each of said loading springs consisting of a helical strip of a substantially rectangular cross section and a hollow-cylindrical overall shape, and each of said loading springs having at its other end an annular mounting flange integral with said strip and firmly secured to said base, said lever being in linked connection with said head structure at a point on the specimen axis of said holders.

References Cited in the file of this patent

FOREIGN PATENTS

| Number | Country | Date |
|--------|---------|------|
| 211,327 | Switzerland | Nov. 18, 1940 |
| 717,130 | Germany | Feb. 6, 1942 |
| 828,769 | Germany | Jan. 21, 1952 |